United States Patent Office 3,418,310
Patented Dec. 24, 1968

3,418,310
THIADIAZOLYL MONOAZO DYES
John I. Dale III, Max A. Weaver, and James M. Straley, Kingsport, Tenn., assignors to Eastman Kodak Company, Rochester, N.Y., a corporation of New Jersey
No Drawing. Filed Oct. 4, 1965, Ser. No. 492,837
9 Claims. (Cl. 260—158)

ABSTRACT OF THE DISCLOSURE

Thiadiazolyl-azo-aniline compounds containing a vinylsulfonylethyl group attached to the aniline nitrogen atom are useful as dyes for hydrophobic textile materials.

---

This invention relates to novel water insoluble azo compounds useful as dyes for textile fibers, yarns and fabrics. In particular, the invention is directed to azo compounds, such as azo dyestuffs, containing both a 1,3,4-thiadiazol-2-yl radical and a vinylsulfonylethyl radical.

The azo compounds of the invention have the general formula (I)
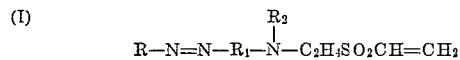
R—N=N—R₁—N(R₂)—C₂H₄SO₂CH=CH₂ wherein R represents a substituted or nonsubstituted 1,3,4-thiadiazol-2-yl radical, that is a radical having the general formula

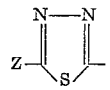

in which Z represents hydrogen; lower alkyl, e.g., methyl; cycloalkylthio, e.g. cyclohexylthio; aryl, e.g. phenyl and substituted phenyl; lower alkylthio, e.g. methylthio; lower alkylsulfonyl, e.g. methylsulfonyl; arylsulfonyl, e.g. phenylsulfonyl; sulfonamido; lower alkanoylamino, e.g. acetamido; halogen, e.g. chlorine; nitro, lower cyannoalkylthio, e.g. cyanoethylthio and the like.

R₁ represents a monocyclic carbocyclic aromatic group of the benzene series derived from an aminoalkyl aniline coupling component and including p-phenylene and p-pheylene substituted with lower alkyl, e.g. o,m-methyl-p-phenylene; lower alkoxy, e.g. o,m-methoxy-p-phenylate, e.g. o,m-chloro p-phenylene; lower alkylthio, e.g. o,m-methylthio-p-phenylene; lower alkanoylamino, e.g. o,m-acetamido-p-phenylate; lower alkylsulfonamido, e.g. o,m-methylsulfonamido-p-phenylene; or benzamido, e.g. benzamido-p-phenylene;

R₂ represents hydrogen or an alkyl radical including unsubstituted alkyl, preferably lower alkyl, i.e. from 1 to 4 carbon atoms, and substituted alkyl such as hydroxyalkyl, e.g. hydroxyethyl; polyhydroxylalkyl, e.g. 2,3-dihydroxypropyl; lower alkoxyalkyl, e.g., methoxyethyl; cyanoalkyl, e.g. cyanoethyl; lower cyanoalkoxyalkyl, e.g. β-cyanoethoxyethyl; lower alkanoyloxyalkyl, e.g. acetoxyethyl; lower carbalkoxyalkyl, e.g. carbethoxyethyl; halogenoalkyl, e.g. chloroethyl; hydroxyhalogenoalkyl, e.g. β-hydroxy-α-chloropropyl; lower alkylsulfonylalkyl, e.g. methylsulfonylethyl; lower alkyl-OCOOCH₂CH₂-, e.g. CH₃OCOOCH₂CH₂; carbamoylalkyl, e.g. carbamoylethyl, lower alkylcarbamoylalkyl, e.g. ethylcarbamoylethyl, benzyl, phenoxyalkyl, e.g. β-phenoxyethyl; lower alkylsulfonamidoalkyl, e.g. methylsulfonamidoethyl; dicarboxamidoalkyl, e.g. β-dicarboxamidoethyl, etc. or R₂ represents a monocyclic carbocyclic aromatic radical of the benzene series, e.g. unsubstituted phenyl and substituted phenyl such as represented by R₁ above, e.g. lower alkylphenyl, lower alkoxyphenyl, halophenyl etc. A preferred group represented by R₂ includes hydrogen, alkyl, alkoxyalkyl, phenoxyalkyl, alkanoyloxyalkyl, haloalkyl, hydroxyalkyl, carbethoxyalkyl or cyanoalkyl, the alkyl groups of which are lower alkyl. As can be seen from the examples given below, the substituents attached to the R, R₁ and R₂ groups serve primarily as auxochrome groups to control the color of the azo compound.

The azo compounds of the invention are prepared by coupling the diazonium salt of a 2-amino-1,3,4-thiadiazole, described above, with a vinylsulfonylethylaniline coupling component having the formula (II)
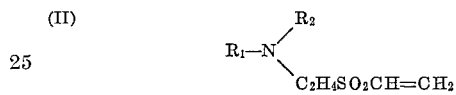
R₁—N(R₂)—C₂H₄SO₂CH=CH₂ wherein R₁ and R₂ have the meanings given above.

The coupling components having the above Formula II are prepared by the following method:

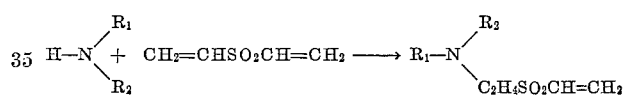
H—N(R₁)(R₂) + CH₂=CHSO₂CH=CH₂ → R₁—N(R₂)—C₂H₄SO₂CH=CH₂

The azo compounds can be used for dyeing textile materials including synthetic polymer fibers, yarns and fabrics giving a variety of fast shades ranging from orange to blue-red and including red, orange and scarlet when applied thereto by conventional dye methods. The azo compounds have excellent affinity for cellulose ester, polyester and polyamide fibers. When the azo compounds are used for dyeing such hydrophobic materials, they should be free of water-soublizing groups such as sulfo and carboxyl. In general, the dyes have good fastness, for example, to light, washing, gas (atmospheric fumes) and sublimation.

The following examples will serve to illustrate the preparation of representative intermediates and azo compounds of our invention.

EXAMPLES OF VINYLSULFONYLETHYLANILINE COUPLERS

Preparation of N-ethyl-N-β-vinylsulfonylethyl-m-toluidine 27 g. of N-ethyl-m-toluidine, 23.6 divinylsulfone, 5 ml. acetic acid and 100 ml. toluene were mixed together and refluxed with stirring for 12 hours. The solvent was removed under reduced pressure and the product distilled under vacuum at 157–159° C./0.35 mm. The product had the structure:

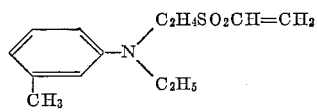

Preparation of N-β-hydroxyethyl-N-β-vinylsulfonyl-ethyl-m-toluidine

In accordance with the method set forth above, a solution of divinylsulfone, N-β-hydroxyethyl-m-toluidine and toluene was refluxed to prepare the product which had the structure:

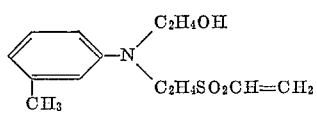

EXAMPLES OF THE DYES

Example 1

To a solution of nitrosyl sulfuric acid prepared by careful addition of 0.72 g. sodium nitrite to 5 ml. conc. sulfuric acid below 80° C. and cooled to 15° C. in an ice bath was added to 10 ml. 1:5 acid (1 part propionic acid: 5 parts acetic acid). The resulting solution was cooled to 3° C. and 1.47 g. 2-amino-5-methylthio-1,3,4-thiadiazole was added with stirring. An additional 10 ml. of 1:5 acid was added below 5° C. and the solution stirred for 1.5 hr. at 0–5° C. It was then added to a chilled solution of 2.53 g. N-ethyl-N-β-vinylsulfonylethyl-m-toluidine in 25 ml. 1:5 acid. The solution was neutralized to a brown color on Congo red paper with ammonium acetate and allowed to couple 2 hr. at ice bath temperature. The solution was drowned in water, the precipitated dye filtered and washed with water. The product dyes nylon fibers a bright red color of outstanding wash fastness. The dye has the structure:

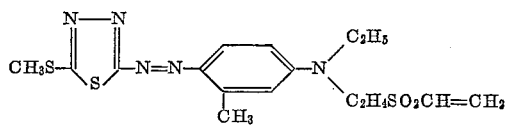

Example 2

Using the procedure and the same quantities of reagents described in Example 1 and substituting 1.35 g. 2-amino-5-chloro-1,3,4-thiadiazole for the methylthio derivative, the resulting diazonium solution was coupled with 2.53 g. N-ethyl-N-β-vinylsulfonylethyl-m-toluidine in 25 ml. 1:5 acid. The dye obtained from this reaction dyes polyamide and polyester fibers fast bright red shades and has the structure:

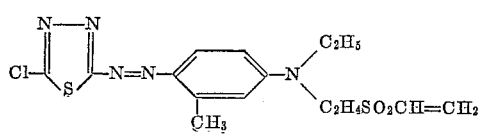

Example 3

Using the procedure and the same quantities of reagents described in Example 1 and substituting 1.01 g. of 2-amino-1,3,4-thiadiazole for the methylthio derivative, the resulting diazonium solution was coupled with 2.53 g. N-ethyl-N-β-vinylsulfonylethyl-m-toluidine in 25 ml. 1:5 acid. The dye obtained from this reaction dyes cellulose acetate, polyesters and polyamides bright orange-yellow shades of good fastness especially to wet processing of polyamides. It has the structure:

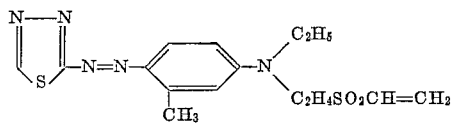

Example 4

Using the procedure and same quantities of reagents as in Example 1 and substituting 1.79 g. 5-methylsulfonyl-2-amino-1,3,4-thiadiazole for the methylthio derivative, the resulting diazonium solution was coupled with 2.53 g. N-ethyl-N-β-vinylsulfonylethyl-m-toluidine. The dye obtained imparts a bright red color to nylon and shows outstanding washfastness on this fiber. It has the structure:

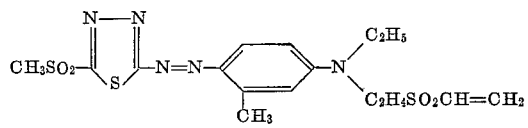

Example 5

Using the procedure and same quantities of reagents in Example 1 and substituting 1.58 g. 2-amino-5-acetamido-1,3,4-thiadiazole for the methylthio derivative, the resulting diazonium solution was coupled with 2.53 g. of N-ethyl-N-β-vinylsulfonylethyl-m-toluidine. The dye obtained dyes nylon and polyester fibers bright scarlet shades of good fastness. It has the structure:

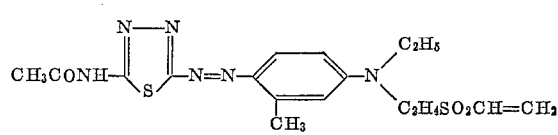

Example 6

Using the procedure and same quantities of reagents as described in Example 1, the resulting diazonium solution was coupled with 2.55 g. N-β-hydroxyethyl-N-β-vinylsulfonyl-m-toluidine. The resulting dye gives fast dyeings on cellulose acetate, polyamides and polyesters and shows good substantivity on cellulose acetate. It has the structure:

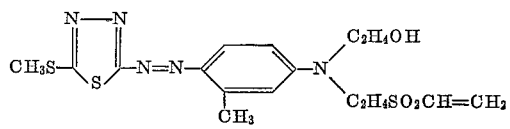

The azo compounds of the following table were prepared by the method illustrated in Examples 1–6. Thus, the diazonium thiadiazole salts were coupled with the vinylsulfonylethyl aniline couplers of the Formula II to obtain dyes having the general structure illustratd by Formula 1, above.

TABLE

| Example | Z | Substituents on $R_1$ | $R_2$ | Color on Nylon |
|---|---|---|---|---|
| 7 | $CH_3S$ | 3—$CH_3$ | —$C_2H_4CN$ | Scarlet. |
| 8 | $CH_3S$ | 3—$CH_3$ | —$CH_2CH_2Cl$ | Red. |
| 9 | $CH_3S$ | 3—$CH_3$ | —$CH_2CH_2OCH_3$ | Red. |
| 10 | $CH_3S$ | 3—$CH_3$ | —$CH_2CH_2N(COCH_3)_2$ | Red. |
| 11 | $CH_3S$ | 3—$CH_3$ | —$CH_2CH_2CO_2C_2H_5$ | Scarlet. |
| 12 | $CH_3S$ | 3—$CH_3$ | —$CH_2CH_2Br$ | Red. |
| 13 | $CH_3S$ | 3—$CH_3$ | —$CH_2CH_2SO_2CH_3$ | Scarlet. |
| 14 | $CH_3S$ | 3—$CH_3$ | —$CH_2CH_2CONH_2$ | Red. |
| 15 | $CH_3S$ | 3—$CH_3$ | —$CH_2CH_2N$(phthalimido) | Red. |
| 16 | $CH_3S$ | 3—$CH_3$ | —$CH_2CH_2OCONH$—$C_6H_5$ | Red. |
| 17 | $CH_3S$ | 3—$CH_3$ | —$CH_2CH_2OH$ | Red. |
| 18 | $C_2H_5S$— | None | —$C_2H_5$ | Orange. |
| 19 | Cyclohexylthio | 2—$CH_3$ | H | Do. |
| 20 | $CH_3SO_2$— | 3—$NHCOCH_3$ | —$C_2H_5$ | Red. |
| 21 | $CH_3$— | 3—$OCH_3$—6—$CH_3$ | —$C_2H_4OCOCH_3$ | Red. |
| 22 | $C_6H_5$ | 2,5-di-$OCH_3$ | —$C_2H_5$ | Red. |
| 23 | $NCCH_2CH_2S$— | 3—$CH_3$ | —$CH_2CHOHCH_2Cl$ | Red. |
| 24 | $CH_3CONH$ | 3—$CH_3$ | —$CH_2CH_2NHCOCH_3$ | Red. |
| 25 | $C_6H_5SO_2$ | 3—$CH_3$ | —$C_2H_5$ | Red. |
| 26 | Br | 3—$CH_3$ | —$C_2H_5$ | Red. |
| 27 | Cl | 3—$CH_3$ | —$C_2H_5$ | Red. |
| 28 | —$CH_2COOC_2H_5$ | 3—$CH_3$ | —$C_2H_5$ | Red. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in an aqueous 0.2% soap, 0.2% ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility, as dyes. The degree of utility varies, for example, depending upon the material being dyed and the formula of the azo compound. Thus, for example, all the dyes will not have the same degree of utility for the same for the same material. As mentioned above, the substituents on the R, $R_1$ and $R_2$ radicals are not critical and serve primarily as auxochrome groups to control the color of the azo compounds.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010; 2,957,745 and 2,989,363 for example, can be dyed. The linear aromatic polyester materials specifically named have a melting point of at least 200° C.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble azo compound having the formula $$R-N=N-R_1-N(R_2)-C_2H_4SO_2CH=CH_2$$

wherein

R is a 1,3,4-thiadiazol-2-yl radical;

$R_1$ is p-phenylene or p-phenylene substituted with lower alkyl, lower alkoxy, chlorine, bromine, lower alkylthio, lower alkanoylamino, lower alkylsulfonamido, or benzamido;

$R_2$ is hydrogen; lower alkyl; lower alkyl substituted with hydroxy, lower alkoxy, cyano, lower cyanoalkoxy, lower alkanoyloxy, chlorine, bormine, lower carbalkoxy, lower alkylsulfonyl, lower alkyl-OCOO-, carbamoyl, lower alkylcarbamoyl, lower alkylsulfonamido, phenoxy, succinimido, phthalimido, or phenylcarbamoyloxy; benzyl; phenyl; or phenyl substituted with lower alkyl, lower alkoxy, chlorine, or bromine.

2. A compound according to claim 1 wherein

R is a 1,3,4-thiadiazol-2-yl radical having the formula

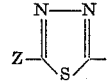

wherein

Z represents hydrogen, lower alkyl, lower alkylthio, chlorine, bromine, or lower alkanoylamino.

3. A compound according to claim 2 wherein
$R_1$ is lower alkyl-p-phenylene; and
$R_2$ is ethyl or hydroxyethyl.
4. The dye:
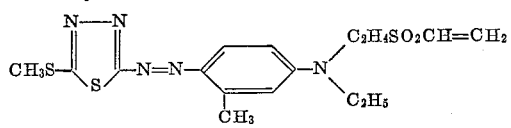
5. The dye:
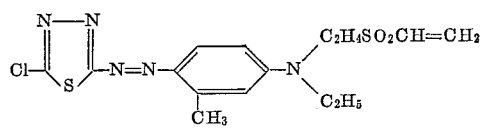
6. The dye:
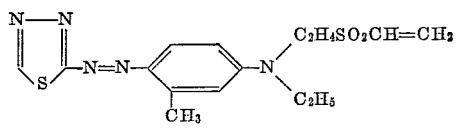
7. The dye:
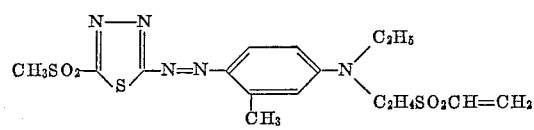
8. The dye:
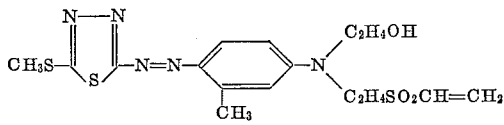
9. The dye:
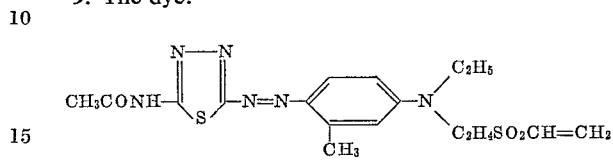
References Cited
FOREIGN PATENTS
779,781   7/1957   Great Britain.
CHARLES B. PARKER, *Primary Examiner.*
DONALD M. PAPUGA, *Assistant Examiner.*
U.S. Cl. X.R.
260—152, 302, 306.8, 326, 326.5, 37, 577, 573, 558, 562, 49; 8—41, 55, 54.2